United States Patent Office 3,173,793
Patented Mar. 16, 1965

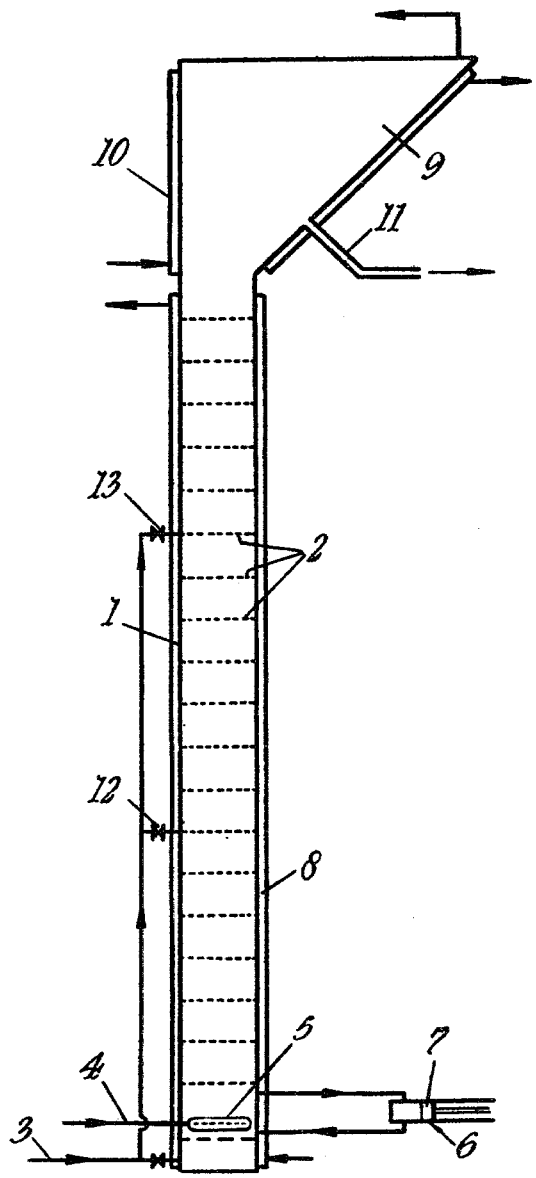

3,173,793
CONTINUOUS FERMENTATION OF WORTS TO PRODUCE ALCOHOLIC LIQUIDS
David Teignmouth Shore, Banstead, Michael George Royston, Crawley, and Eric G. Watson, Dorking, England, assignors to The A.P.V. Company Limited, Crawley, England
Filed Nov. 30, 1962, Ser. No. 241,361
Claims priority, application Great Britain, Dec. 1, 1961, 43,111/61
5 Claims. (Cl. 99—52)

This invention relates to the continuous production of potable alcoholic liquids by fermentation but is particularly concerned with the continuous fermentation of wort to produce beer.

High rates of fermentation can be achieved by applying two principles: (a) the maintenance of a high yeast concentration in the system, and (b) imposing in the fermenting vessel conditions of minimum internal mixing of the wort such that any particle of wort ferments progressively from sugar to alcohol as it passes through the vessel.

Conveniently, therefore, the form of the fermenting vessel is that of a long tube, pipe or tower which for maximum economy of space and supporting means is placed vertically. The vessel will hereinafter be referred to as the fermenting tower. The fermenting tower contains a high yeast concentration such that, if the contents of the tower are allowed to settle, the yeast will occupy 20–60% of the total volume of the tower. Under these conditions the fermentation can be completed in 1½–8 hours. The yeast used must be of a flocculating top or bottom fermentation type so that it is maintained as a dense bed in the tower. In order to prevent excessive carry over of yeast from the top of the tower a separating zone is provided in which the yeast largely settles out from the effluent beer so that the yeast level builds up until yeast is carried out of the system with the beer or is pumped away from the yeasty zone only at the same rate that it is produced by the normal processes of yeast reproduction in the fermenting tower.

In order to provide an atmosphere appropriate for the healthy reproduction of yeast in the early stages of fermentation a limited amount of air or oxygen may be injected into the bottom of the tower adjacent to the point of introduction of the wort. The tower is provided with an attemperation system to provide a constant temperature in the range 50° F. to 85° F. as required for the fermentation. The broad principles of this type of fermentation and apparatus therefore are described in co-pending patent application No. 155,081, having the same assignees as the present application.

The specific gravity of the final product is controlled (a) by controlling the flow of wort to the fermenting tower, i.e. by controlling the residence time and/or (b) by controlling the temperature of fermentation. The residence time in the fermenting vessel may be controlled either by adjusting the rate of feed of the wort to the tower or by introducing the wort at any one of a series of superposed levels in the tower, thus varying the effective residence time for the same rate of flow.

In order to operate a tower fermenter of commercial proportions, i.e. over three inches diameter using a highly flocculent yeast it may be necessary to provide some device within the tower for stabilising the yeast plug and for preventing its sudden settlement to the base of the tower.

In smaller diameter towers (i.e. below three inches in diameter) it is possible to stabilise the yeast plug by the agitating effect of the fermentation gas especially if the tower height is very large compared with the tower diameter. A further effect which contributes to the stability of small scale, i.e. 1 to 3 inches diameter fermenting towers, is the bridging of the yeast bed across the diameter of the tower. As the tower diameter is increased this bridging or wall effect is reduced so that above 6 inches diameter and for towers under 20 feet high it is necessary to provide a mechanical means of yeast plug stabilisation.

The principle behind any such stabilising device is to provide a means of distributing the yeast uniformly across the tower cross-section to prevent the accumulation of local dense patches of material and also to distribute the passage of fermentation gas uniformly across the tower so as to encourage the re-distribution of the yeast momentarily displaced by the gas and to prevent the formation of channels through the yeast by the ascending fermentation gas.

The most efficient method of redistributing the yeast and fermentation gas is to create a vertical oscillatory displacement of the fluid contents of the tower relative to a series of orifices or constrictions therein. The action is thus one of dividing and subdividing the fluid. Any large lumps of yeast are broken up so exposing a larger cell area to the wort and hence increasing the fermentation rate. The action also breaks up any large bubbles of gas and so prevents excessive channelling of the yeast bed.

Dynamic stabilizing devices can take several forms. One consists of applying a pulsating flow to the contents of a tower equipped with trays or packing devices. These packing devices may be in the form of stacked or randomly dumped hollow cylinders, or rings; or stacked truncated cones with the apex upward; or a series of grids stacked one on the other; or a stack of sloping plates either perforated or unperforated; or corrugated sheets stacked one on the other either perforated throughout or drilled along ridge and trough to allow the controlled escape of yeast and fermentation gas.

The provision of trays can take the form of simple perforated sheets, corrugated or flat stretched at intervals across the tower; or trays composed of flat or rounded slats with gaps to allow for the controlled flow of yeast or fermentation gas; or trays with positive down spouts for the maintenance of the desired yeast population in the zone below the plate. In fact almost any distribution surface can be used which includes orifices through which yeast and gas may pass, any mounting or support means therefor being designed to give a minimum hold or lodgement for settled yeast. The pulsations across such distributing devices not only give improved distribution but also scour the column of deposits and pockets of yeast cells.

An alternative dynamic device is one which, while permitting a uniform wort flow, provides means for reciprocating the perforated trays within the tower to produce substantially the same effect as that of the combination pulsating flow with stationary plates.

It should be understood that the principle in the above examples is identical, the only difference being which phase is considered stationary and which oscillatory.

The invention consists in a method of achieving rapid fermentation of wort for the production of beer or other potable alcohol liquid in a tower fermenter with temperature, yeast plug population, aeration, and final liquid specific gravity control, comprising passing the wort substantially unidirectionally through the tower, maintaining a concentration gradient of sugar through the tower and a high yeast population throughout the tower, and also maintaining by means of mechanical devices a uniform yeast and gas distribution across the cross-section of the tower.

The invention further consists in a tower fermenter for producing fermentation of raw wort in the production of beer or other potable alcoholic liquid comprising an elongated tower, means for introducing raw wort at or near a feed end of the tower, a separating zone at least of equal volume to the tower and attached to that end of the tower remote from said feed end, for receiving fermented wort from the tower and allowing settlement of the yeast therefrom, means for introducing gas into the tower at or near the feed end and means for stabilizing a yeast plug within the tower.

In the accompanying drawing, one mode of carrying the invention into effect is illustrated by way of example with respect to a fermenting system which employs a tower structure having fixed perforated plates and a particular pulsating device, i.e. a pulse pump for stabilizing the yeast plug. In this particular instance the tower 1 is one foot in diameter and twenty feet high being fitted with perforated plates 2 at one foot intervals. The plate perforations are one inch in diameter on a two inch triangular pitch. It will be realised, however, that a wide range of perforation sizes are possible. The wort is fed into the base of the tower 1 by a pipe 3, and air or oxygen by a pipe 4 and a sparge ring 5. The tower 1 contains approximately 40% settled volume of yeast, which forms a uniform bed which is maintained by the gentle pulsing action of a pulsing unit 6. The flow of formentation gas is assisted by the forward stroke of the piston 7 of the pulsing unit 6 and the settlement of the yeast on the plates 2 is prevented by the suction through the perforations on the back stroke. The yeast is therefore maintained uniformly distributed and the residence time of wort/beer in the tower will be about 3 hours.

Attemperation jackets 8 on the tower 1 maintains the contents at 65° F. and at the head of the tower 1, the product beer enters a separating zone 9 in which the yeast falls back into the top of the tower. The separation should be at least equal in volume to the tower fermenter and should preferably be conical in shape with no slope shallower than 45° in order to minimize lodging of the yeast. This not only prevents the excessive loss of yeast from the system but also provides a high concentration of yeast at the end of the fermentation thus counteracting to some degree the low fermentation rate which would otherwise result from the low fermentable sugar content of the beer at this point. Settled yeast in the separation zone 9 which is in excess of the requirements for the yeast bed in the tower 1 can be drawn off as a surplus through a pipe 11. The separating zone 9 is maintained at constant temperature by a jacket 10. The temperature may if necessary be lower than that of the main fermenter tower to assist in settling the yeast.

The final gravity of the beer is controlled by controlling the temperature or by injecting a portion of the wort into the tower 1 at some position indicated at 12 and 13 above the feed pipe 3. Alternatively the wort may all be introduced into the tower at position 12 or 13 to vary the effective residence time in the tower.

The surplus yeast which is produced by the normal course of cell reproduction can be allowed to overflow with the beer or be pumped away to maintain a constant level of yeast in the separating zone 9. The fermentation gas can be removed with the produce beer to prevent the accumulation of static pockets of foam in the separating zone 9. The fermenting tower thus operated constitutes a rapid means of producing beer from wort with consequent savings in floor space. By the nature of the continuous method of operation and the case which it can be controlled it represents a considerable saving in labour costs over conventional methods of formentation.

The separation zone 9 must be considered as an inherent part of the tower 1 as regards the fermentation process. Thus it may properly be considered to comprise an enlarged and specially shaped extension of the fermentation volume of the tower in which yeast separation can, and does, take place, but in which a degree of continuing fermentation takes place.

While the major proportion of fermentation takes place in the small section volume of the tower proper, final fermentation may be achieved in the enlarged section portion of the tower comprising the separation zone 9 to an extent dependent on the residual sugar content of the fermenting liquid, its temperature and the yeast concentration.

Considering the matter in relating to the fermentation of wort to produce beer, for example, the fermentation conditions in the separating zone 9 may be adjusted not only to produce fully attenuated top fermentation beers but also to provide a degree of secondary fermentation which is normally achieved during the subsequent conditioning treatment of the beers. To this end unfermented wort (or other fermentable material) may be added to the fermenting beer in the separation zone 9 under suitable local conditions of temperature and yeast concentration, by means of a suitable pipe or the like.

The temperature control can be achieved by means of the attempering jacket 10 surrounding the separating zone 9 and adjusted so as to allow for any desired degree of yeast activity ranging from a state of quiescence at low temperatures (when secondary fermentation is suppressed) to full yeast activity at primary fermentation temperatures.

The balance between primary and secondary fermentation, which depends on the attenuation of the beer leaving the tower, is therefore controlled by means of temperature, flow rate and the injection point of the wort into the tower and by the addition of wort or sugar primings to the beer in the separation zone.

The beer derived from such combined primary and secondary fermentation, while not a matured beer, will require less conditioning than normal batch produced beer, since the secondary fermentation can be allowed to proceed much more rapidly within the fermenter than would be possible in conditioning tanks.

We claim:

1. In the continuous fermentation of worts for the production of potable alcoholic liquids in a tower fermenter with control of temperature, aeration, yeast plug population, and final specific gravity: the steps of continuously passing the wort substantially unidirectionally through a fermenting zone of the tower, maintaining a concentration gradient of sugar through the fermentation zone so that the sugar content of the wort declines progressively and continuously through the fermentation zone, maintaining a high yeast population in the fermentation zone such that the settled volume of the yeast is equal to between 20 and 60% of the volume of the fermentation zone, supporting the yeast population upon a series of perforated plates distributed along the fermentation zone, and dynamically stabilizing the yeast and gas by causing an oscillatory movement relative to the plates to be superimposed upon the unidirectional motion of the liquid passing through the fermentation zone.

2. In the continuous fermentation of worts for the production of potable alcoholic liquids in a tower fermenter with control of temperature, aeration, yeast plug population, and final specific gravity; the steps of passing the wort continuously and substantially undirectionally through a fermenting zone of the tower, maintaining a concentration gradient of sugar through the fermentation zone so that the sugar content of the wort declines progressively and continuously through the fermentation zone, maintaining a high yeast population in the fermentation zone such that the settled volume of the yeast is equal to between 20 and 60% of the volume of the fermentation zone, providing mechanical supports for the yeast in the fermentation zone, and dynamically stabilizing the yeast and gas by causing an oscillatory movement relative to the mechanical supports to be imposed upon the liquid passing through the fermentation zone.

3. In the continuous fermentation of worts for the production of potable alcoholic liquids in a tower fermenter with control of temperature, aeration, yeast plug population, and final specific gravity: the steps of passing the wort continuously and substantially unidirectionally through a fermenting zone of the tower, maintaining a concentration gradient of sugar through the fermentation zone so that the sugar content of the wort declines progressively and continuously through the fermentation zone, maintaining a high yeast population in the fermentation zone, providing mechanical supports for the yeast in the fermentation zone such that the settled volume of the yeast is equal to between 20 and 60% of the volume of the fermentation zone, and dynamically stabilizing the yeast and gas by superimposing a gentle pulsing movement upon the unidirectional flow of the liquid passing through the fermentation zone.

4. In the continuous fermentation of worts for the production of potable alcoholic liquids in a tower fermenter with control of temperature, aeration, yeast plug population, and final specific gravity; the steps of continuously passing the wort substantially unidirectionally through a fermenting zone of the tower, maintaining a concentration gradient of sugar through the fermenting zone so that the sugar content of the wort declines progressively and continuously through the fermenting zone, maintaining a high yeast population in the fermenting zone such that the settled volume of the yeast is equal to between 20 and 60 percent of the volume of the fermentation zone, providing mechanical supports for the yeast, dynamically stabilizing the yeast and gas by causing an oscillatory movement relative to the mechanical supports to be imposed on the liquid passing through the fermenting zone, and adding unfermented wort to the fermented liquid in a separating zone at issuance from the fermenting zone.

5. In the continuous fermentation of worts for the production of potable alcoholic liquids in a tower fermenter with control of temperature, aeration, yeast plug population, and final specific gravity; the steps of continuously passing the wort substantially undirectionally through a fermenting zone of the tower, maintaining a concentration gradient of sugar through the fermenting zone so that the sugar content of the wort declines progressively and continuously through the fermenting zone, maintaining a high yeast population in the fermenting zone such that the settled volume of the yeast is equal to between 20 and 60 percent of the volume of the fermentation zone, supporting the yeast population upon a series of perforated plates distributed along the fermenting zone, dynamically stabilizing the yeast and gas by causing an oscillatory movement relative to the plates to be superimposed upon the undirectional motion of the liquid passing through the fermenting zone, and adding unfermented wort to the fermented liquid in a separating zone at issuance from the fermenting zone.

References Cited by the Examiner

UNITED STATES PATENTS

| | | | |
|---|---|---|---|
| 2,513,687 | 7/50 | Strezynski | 99—51 |
| 2,671,045 | 3/54 | Ruzicka | 195—129 |
| 2,726,957 | 12/55 | Kung | 99—51 |
| 2,933,435 | 4/60 | Graff et al. | 195—129 |
| 2,967,107 | 1/61 | Geiger et al. | 99—43 |
| 3,078,166 | 2/63 | Hough et al. | 99—43 |

FOREIGN PATENTS 872,396    7/61    Great Britain.

A. LOUIS MONACELL, *Primary Examiner.*

ABRAHAM H. WINKELSTEIN, *Examiner.*